(12) United States Patent
Watanabe et al.

(10) Patent No.: US 6,316,118 B1
(45) Date of Patent: Nov. 13, 2001

(54) FIRE-RETARDANT VINYL CHLORIDE RESIN MOLDING

(75) Inventors: Kenji Watanabe; Kazuhiro Oritani, both of Osaka (JP)

(73) Assignee: Takiron Co., Ltd., Osaka (JP)

( * ) Notice: Subject to any disclaimer, the term of this patent is extended or adjusted under 35 U.S.C. 154(b) by 0 days.

(21) Appl. No.: 09/304,983

(22) Filed: May 4, 1999

(30) Foreign Application Priority Data

| May 11, 1998 | (JP) | 10-146507 |
| Sep. 4, 1998 | (JP) | 10-267360 |
| Mar. 15, 1999 | (JP) | 11-067945 |

(51) Int. Cl.[7] .................................. B32B 27/30
(52) U.S. Cl. ........................... 428/518; 428/213
(58) Field of Search ..................... 428/518, 522, 428/520, 328, 213; 524/425, 450; 106/436, 437, 442

(56) References Cited

U.S. PATENT DOCUMENTS

| 2,187,050 | * | 1/1940 | Patterson | 106/442 |
| 4,098,748 | * | 7/1978 | Moore et al. | 523/200 |
| 4,374,205 | * | 2/1983 | Hall | 521/85 |
| 5,415,921 | * | 5/1995 | Grohman | 428/216 |
| 5,641,826 | * | 6/1997 | Lawson et al. | 524/417 |
| 5,789,453 | * | 8/1998 | Detterman | 521/92 |

FOREIGN PATENT DOCUMENTS

WO 97/40094 * 10/1997 (WO).

* cited by examiner

*Primary Examiner*—Paul Thibodeau
*Assistant Examiner*—D. Lawrence Tarazano
(74) *Attorney, Agent, or Firm*—Suhgrue, Mion, Zinn, Macpeak & Seas, PLLC

(57) ABSTRACT

An fire-retardant vinyl chloride resin molding which satisfies the FM standard (evaluation criteria of fire-retardant property provided by Factory Mutual Research Corporation). The molding comprises from 5 to 50 parts by weight of titanium oxide and 100 parts by weight of a vinyl chloride resin.

12 Claims, No Drawings

FIRE-RETARDANT VINYL CHLORIDE RESIN MOLDING

FIELD OF THE INVENTION

This invention relates to fire-retardant vinyl chloride resin moldings, more particularly, it relates to fire-retardant vinyl chloride resin moldings which satisfy the FM standard (evaluation criteria of fire-retardant property provided by Factory Mutual Research Corporation).

BACKGROUND OF THE INVENTION

Since vinyl chloride resin has excellent moldability, high mechanical strength and good chemical resistance and is inexpensive, it is broadly used in various fields, including semiconductor production apparatuses, as industrial materials, particularly as corrosion resistant industrial materials.

However, though vinyl chloride resin has fire-retardant property due to its high chlorine content, it has poor heat resistance so that it causes thermal decomposition when exposed to a temperature of 200° C. or more, thereby inducing smoke by organic matter and also generating corrosive gases such as chlorine gas and hydrogen chloride gas. Accordingly, when a fire starts in an apparatus which uses moldings of such a vinyl chloride resin, smoke and gas are generated due to decomposition of said resin.

With the aim of preventing such accidents, a phosphorus based fire retardant, a halogen based retardant or a water-containing compound such as of magnesium hydroxide has been added to vinyl chloride resin to improve its fire-retardant property. However, even in the case of moldings of vinyl chloride resin whose fire-retardant property is improved in this manner, when they are used for example in semiconductor production apparatuses, smoke and corrosive gas generated by a fire reduce the purity of air in the production facility and thereby cause a possible danger of polluting and spoiling production apparatuses, instruments and semiconductor parts.

In view of such situations, fire-retardant property and the ability to inhibit generation of smoke and corrosive gas at the time of fire have recently been demanded even for the vinyl chloride resin said to have fire-retardant property in general, and since such a demand is particularly strong in the field of insurance organizations, the evaluation criteria provided by Factory Mutual Research Corporation that constitutes Factory Mutual System, an industrial mutual insurance organization having a base of operations in North America, are effectively used.

According to this evaluation criteria, a fire propagation index FPI of 6 or less which shows fire-retardant property, a smoke damage index SDI of 0.4 or less which shows smoking ability and a corrosion damage index CDI of 1.1 or less which shows corrosive gas generation are required at the same time, based on a fire-retardant property test of clean room materials (FMRC Clean Room Materials Flammability Test, to be referred to as "FM standard" hereinafter) cited as Class Number 4910.

Regarding these requirements, a fire propagation index FPI of 6 or less of vinyl chloride resin moldings can be achieved relatively easily by the addition of a fire retardant additive, but it is not easy to obtain a vinyl chloride resin molding which also satisfies the smoke damage index SDI and corrosion damage index CDI at the same time, and only extremely few moldings such as the fire-retardant vinyl chloride resin moldings disclosed by the present inventors in Japanese Patent Application No. 9-365319 can satisfy the FPI, SDI and CDI standards at the same time. Such moldings, however, have disadvantages of being not so good in strength, chemical resistance and corrosion resistance.

SUMMARY OF THE INVENTION

The present invention has been made taking the aforementioned problems into consideration, with the aim of providing a fire-retardant vinyl chloride resin molding of more desirable blending composition, which satisfies all criteria of FPI, SDI and CDI and has practical strength, chemical resistance and corrosion resistance.

As a result of intensive studies, the inventors of the present invention have found an entirely unexpected fact that titanium oxide which is conventionally formulated in a small amount as an ingredient such as a pigment can achieve the just described object by effectively acting as a fire retardant when it is contained in a vinyl chloride resin at a specified ratio. This invention has been accomplished on the basis of this finding.

According to a first embodiment of the present invention, there is provided a fire-retardant vinyl chloride resin molding which comprises from 5 to 50 parts by weight of titanium oxide and 100 parts by weight of a vinyl chloride resin.

According to a second embodiment of the present invention, there is provided a fire-retardant vinyl chloride resin molding which comprises from 5 to 50 parts by weight of titanium oxide, 100 parts by weight of a vinyl chloride resin and at least one compounding agent selected from the group consisting of a chlorine capturing compound, an inorganic auxiliary and a fire retarding auxiliary in such an amount that the total content of titanium oxide and the compounding agent is 60 parts by weight or less based on 100 parts by weight of the vinyl chloride resin.

According to a third embodiment of the present invention, there is provided a fire-retardant vinyl chloride resin molding which comprises a base layer and a surface layer provided on at least one side of the base layer, wherein:

said base layer comprises from 5 to 50 parts by weight of titanium oxide and 100 parts by weight of a vinyl chloride resin;

said surface layer comprises from 0 to 30 parts by weight of titanium oxide and 100 parts by weight of the vinyl chloride resin;

and the titanium oxide content of the surface layer is smaller than the titanium oxide content of the base layer.

According to a fourth embodiment of the present invention, there is provided a fire-retardant vinyl chloride resin molding which comprises a base layer and a surface layer provided on at least one side of the base layer, wherein:

said base layer comprises from 5 to 50 parts by weight of titanium oxide, 100 parts by weight of a vinyl chloride resin, and at least one compounding agent selected from the group consisting of a chlorine capturing compound, an inorganic auxiliary and a fire retarding auxiliary in such an amount that the total content of titanium oxide and the compounding agent in the base layer is 60 parts by weight or less based on 100 parts by weight of the vinyl chloride resin;

said surface layer comprises from 0 to 30 parts by weight of titanium oxide and 100 parts by weight of the vinyl chloride resin; and the titanium oxide content of the surface layer is smaller than the titanium oxide content of the base layer.

According to a fifth embodiment of the present invention, there is provided a fire-retardant vinyl chloride resin molding which comprises a base layer and a surface layer provided on at least one side of the base layer, wherein:

said base layer comprises from 5 to 50 parts by weight of titanium oxide and 100 parts by weight of a vinyl chloride resin;

said surface layer comprises from 0 to 30 parts by weight of titanium oxide, 100 parts by weight of the vinyl chloride resin, and at least one compounding agent selected from the group consisting of a chlorine capturing compound, an inorganic auxiliary and a fire retarding auxiliary in such an amount that the total content of titanium oxide and the compounding agent in the surface layer is 40 parts by weight or less based on 100 parts by weight of the vinyl chloride resin;

the titanium oxide content of the surface layer is smaller than the titanium oxide content of the base layer.

According to a sixth embodiment of the present invention, there is provided a fire-retardant vinyl chloride resin molding which comprises a base layer and a surface layer provided on at least one side of the base layer, wherein:

said base layer comprises from 5 to 50 parts by weight of titanium oxide, 100 parts by weight of a vinyl chloride resin, and at least one compounding agent selected from the group consisting of a chlorine capturing compound, an inorganic auxiliary and a fire retarding auxiliary in such an amount that the total content of titanium oxide and the compounding agent in the base layer is 60 parts by weight or less based on 100 parts by weight of the vinyl chloride resin;

said surface layer comprises from 0 to 30 parts by weight of titanium oxide, 100 parts by weight of the vinyl chloride resin, and at least one compounding agent selected from the group consisting of a chlorine capturing compound, an inorganic auxiliary and a fire retarding auxiliary in such an amount that the total content of titanium oxide and the compounding agent in the surface layer is 40 parts by weight or less based on 100 parts by weight of the vinyl chloride resin;

the titanium oxide content of the surface layer is smaller than the titanium oxide content of the base layer.

Other objects and advantages of the present invention will be made apparent as the description progresses.

DETAILED DESCRIPTION OF THE INVENTION

A first embodiment of the present invention is a fire-retardant vinyl chloride resin molding which comprises from 5 to 50 parts by weight of titanium oxide based on 100 parts by weight of a vinyl chloride resin.

Titanium oxide, in the form of inorganic particles, has high brightness and heat conductivity and is not decomposed at up to 1,200 to 1,300° C., and fire-retardant property is improved and the amount of smoke and gas generation is reduced when titanium oxide is contained in a vinyl chloride resin. The reason (mechanism) for such effects is not clear but could be assumed as follows.

In general, when excess heat is added from outside to a vinyl chloride resin molding, chlorine atoms in the vinyl chloride resin are released by the heat and exert fire-retardant action and, at the same time, the resin from which chlorine atoms are released is decomposed by the heat and entails combustion. It seems that fire-retardant property of the vinyl chloride resin molding is improved and the amount of smoke and gas generation is reduced when titanium oxide is present in this process, because titanium oxide is not decomposed up to a high temperature of 1,200 to 1,300° C. and exerts an action to block heat from the outside (thermal shield action) due to its high brightness and, during the thermal decomposition and combustion steps of the resin after release of chlorine atoms, it exerts an action to carbonize said resin more quickly (carbonization acceleration action) due to its high heat conductivity. In addition, reduction of the amount of vinyl chloride resin as an organic substance by the addition of titanium oxide is also one of the factors for the improvement of fire-retardant property.

As is evident from the test data which will be described later, when the titanium oxide content is smaller than 5 parts by weight, it becomes difficult to obtain a fire-retardant vinyl chloride resin molding having a fire propagation index FPI of 6 or less, a smoke damage index SDI of 0.4 or less and a corrosion damage index CDI of 1.1 or less, and when the titanium oxide content is larger than 50 parts by weight, the use of the molding as an industrial material becomes not practical because its mechanical strength and moldability become poor and its chemical resistance and corrosion resistance are also reduced, so that the object of the present invention cannot be achieved easily in both cases.

A second embodiment of the present invention is a fire-retardant vinyl chloride resin molding which comprises from 5 to 50 parts by weight of titanium oxide based on 100 parts by weight of a vinyl chloride resin and at least one compounding agent selected from a chlorine capturing compound, an inorganic auxiliary and a fire retarding auxiliary in such an amount that the total content of titanium oxide and the compounding agent becomes 60 parts by weight or less.

In the case of a molding in which a chlorine capturing compound is added as a compounding agent to a vinyl chloride resin together with titanium oxide, the chlorine atoms released at the time of combustion are captured by the chlorine capturing compound to further reduce the amount of generated corrosive gases such as chlorine gas and hydrogen chloride gas, in addition to the significant effect of titanium oxide to improve fire-retardant property by its thermal shield action and carbonization acceleration action as described in the foregoing, so that it becomes a molding particularly having small corrosion damage index CDI. Also, in the case of a molding in which an inorganic auxiliary or a fire retarding auxiliary is added as a compounding agent to a vinyl chloride resin together with titanium oxide, titanium oxide and these auxiliaries synergistically increase carbonization acceleration action, so that it becomes a molding particularly having small fire propagation index FPI and smoke damage index SDI. In addition, since the total content of titanium oxide and the compounding agent in these moldings is 60 parts by weight or less based on 100 parts by weight of the vinyl chloride resin, so that reduction of the properties of these moldings, such as mechanical strength, chemical resistance and moldability, can be controlled within necessary ranges.

A third embodiment of the present invention is a fire-retardant vinyl chloride resin molding which comprises an integrated molding formed by laminating a surface layer on at least one side of a base layer, wherein said base layer contains from 5 to 50 parts by weight of titanium oxide based on 100 parts by weight of a vinyl chloride resin, and said surface layer contains from 0 to 30 parts by weight of titanium oxide based on 100 parts by weight of the vinyl chloride resin so that its titanium oxide content becomes smaller than the titanium oxide content of the base layer.

A fourth embodiment of the present invention is a fire-retardant vinyl chloride resin molding which comprises an integrated molding formed by laminating a surface layer on at least one side of a base layer, wherein said base layer contains from 5 to 50 parts by weight of titanium oxide based on 100 parts by weight of a vinyl chloride resin and at least one compounding agent selected from a chlorine capturing compound, an inorganic auxiliary and a fire retarding auxiliary in such an amount that the total content of titanium oxide and the compounding agent becomes 60 parts by weight or less, and said surface layer contains from 0 to 30 parts by weight of titanium oxide based on 100 parts by weight of the vinyl chloride resin so that its titanium oxide content becomes smaller than the titanium oxide content of the base layer.

Since each of the surface layers of the third and forth moldings contains titanium oxide in such a small amount of 30 parts by weight or less based on 100 parts by weight of the vinyl chloride resin that its titanium oxide content becomes smaller than the titanium oxide content of the base layer, the surface of moldings (surface layer) has chemical resistance and corrosion resistance which are almost the same as the original good chemical resistance and corrosion resistance of the vinyl chloride resin. In addition, since the base layer is a layer which is excellent in fire-retardant property and has the same composition of the aforementioned first and second fire-retardant vinyl chloride resin moldings, and the surface layer also contains titanium oxide as described in the above, these third and fourth moldings have a fire-retardant property which generally satisfies all of the criteria of the FM standard.

A fifth embodiment of the present invention is a fire-retardant vinyl chloride resin molding which comprises an integrated molding formed by laminating a surface layer on at least one side of a base layer, wherein said base layer contains from 5 to 50 parts by weight of titanium oxide based on 100 parts by weight of a vinyl chloride resin, and said surface layer contains from 0 to 30 parts by weight of titanium oxide based on 100 parts by weight of the vinyl chloride resin so that its titanium oxide content becomes smaller than the titanium oxide content of the base layer and also contains at least one compounding agent selected from a chlorine capturing compound, an inorganic auxiliary and a fire retarding auxiliary in such an amount that the total content of titanium oxide and the compounding agent becomes 40 parts by weight or less.

A sixth embodiment of the present invention is a fire-retardant vinyl chloride resin molding which comprises an integrated molding formed by laminating a surface layer on at least one side of a base layer, wherein said base layer contains from 5 to 50 parts by weight of titanium oxide based on 100 parts by weight of a vinyl chloride resin and at least one compounding agent selected from a chlorine capturing compound, an inorganic auxiliary and a fire retarding auxiliary in such an amount that 3the total content of titanium oxide and the compounding agent becomes 60 parts by weight or less, and said surface layer contains from 0 to 30 parts by weight of titanium oxide based on 100 parts by weight of the vinyl chloride resin so that its titanium oxide content becomes smaller than the titanium oxide content of the base layer and also contains at least one compounding agent selected from a chlorine capturing compound, an inorganic auxiliary and a fire retarding auxiliary in such an amount that the total content of titanium oxide and the compounding agent becomes 40 parts by weight or less and smaller than the total content of the base layer.

Each of the surface layers of the fifth and sixth moldings contains titanium oxide in a small amount of from 0 to 30 parts by weight based on 100 parts by weight of the vinyl chloride resin, and the total content of titanium oxide and the compounding agent is also small which is 40 parts by weight, so that the surface of moldings (surface layer) has chemical resistance and corrosion resistance which are almost the same as the original good chemical resistance and corrosion resistance of the vinyl chloride resin. In addition, since the base layer is a layer which is excellent in fire-retardant property and has the same composition of the aforementioned first and second fire-retardant vinyl chloride resin moldings, and the surface layer also contains titanium oxide and the compounding agent as described in the above, these fifth and sixth moldings have a fire-retardant property which generally satisfies all of the criteria of the FM standard.

In this connection, the aforementioned first and second fire-retardant vinyl chloride resin moldings include not only moldings of single layer structure but also moldings of multiple layer structure having two or more layers. For example, even in the case a molding of multiple layer structure containing a vinyl chloride resin layer in which the titanium oxide content and the total content of titanium oxide and a compounding agent are outside of the aforementioned ranges, it is included in the first and second moldings when the titanium oxide content and the total content of titanium oxide and the compounding agent are within the aforementioned ranges as the entire molding.

The following describes the present invention further in detail.

The fire-retardant vinyl chloride resin moldings of the present invention roughly includes the following two embodiments. One is moldings which comprise a single layer structure having the same composition as a whole, and the other is moldings which comprise a laminate structure having a base layer and a surface layer of different compositions.

Among the fire-retardant vinyl chloride resin moldings of a single layer structure, the first molding A contains titanium oxide within the range of from 5 to 50 parts by weight based on 100 parts by weight of a vinyl chloride resin, and the molding A may contain an appropriate amount of additives necessary for the molding process, such as a lead based or tin based heat stabilizer, a lubricant, a processing auxiliary and a coloring agent.

In the molding A, amount of the vinyl chloride resin as an organic substance is reduced corresponding to the amount of titanium oxide included, and titanium oxide exerts thermal shield action and carbonization acceleration action as described in the foregoing, so that its fire-retardant property is markedly improved and the amount of smoke and gas generation is reduced.

The term "vinyl chloride resin" as used herein includes not only the resin obtained by polymerization of vinyl chloride monomer but also includes a copolymer obtained by copolymerizing vinyl chloride monomer with other monomer(s).

Examples of the vinyl chloride resin to be used include (a) a general vinyl chloride resin having a chlorination degree of about 56%, (b) a post-chlorination vinyl chloride resin having a chlorination degree of 58% to 73%, (c) a resin mixture of these vinyl chloride resins, (d) a resin mixture in which these vinyl chloride resins are mixed with other resins such as a vinyl acetate resin and an acrylic resin, and (e) a copolymer resin of vinyl chloride with another monomer such as vinyl acetate or ethylene. In this connection, the resins of (c), (d) or (e) are mixed or copolymerized at such a ratio that their average chlorination degree becomes 50% or more and 73% or less.

The general vinyl chloride resin (a) is particularly useful when a molding A having excellent chemical resistance is obtained, the post-chlorination vinyl chloride resin (b) is particularly useful when a molding A having excellent fire-retardant property is obtained because of its large carbonization acceleration action, the mixed resin (c) is particularly useful when a molding A having good balance between chemical resistance and fire-retardant property is obtained, and the mixed resin (d) or copolymer (e) is particularly useful when a molding A having improved physical properties such as moldability and bending ability (elongation) is obtained.

A correlation exists between chlorination degree of vinyl chloride resin and carbonization acceleration action by titanium oxide, namely, the carbonization acceleration action of titanium oxide becomes strong as the chlorination degree of vinyl chloride resin increases. In consequence, in order to obtain a titanium oxide-containing molding A having excellent fire-retardant property, it is desirable to use a vinyl chloride resin having a chlorination degree of from 58% to 73%. When a vinyl chloride resin having a chlorination degree of smaller than 58% is used, the carbonization acceleration action of titanium oxide is not so significant so that it is necessary to increase the titanium oxide content to add excellent fire-retardant property, and when a vinyl chloride resin having a chlorination degree of larger than 73% is used, production of a molding is difficult to carry out and its heat stability, moldability and bending ability also become poor so that such a resin is not suitable as the material resin of molding A. Accordingly, a resin having a chlorination degree of from 62 to 66% is used more preferably.

Examples of the vinyl chloride resin having a chlorination degree of from 58% to 73% include the aforementioned post-chlorination vinyl chloride resin (b) and a mixture of this post-chlorination vinyl chloride resin with at least one of other resins such as a general vinyl chloride resin, a vinyl acetate resin, an acrylic resin, a vinyl chloride-vinyl acetate copolymer resin and a vinyl chloride-ethylene copolymer resin, which are mixed at such a ratio that the average chlorination degree becomes 58% or more and 73% or less.

As the titanium oxide, on the other hand, its powder having an average particle size of approximately from 0.1 to 0.5 $\mu$m is preferably used. This is because such titanium oxide powder has good kneading ability with vinyl chloride resin so that it can be included under uniformly dispersed condition. Titanium oxide powder whose surfaces are coated with alumina is particularly desirable, because the addition of such coated powder renders possible further acceleration of carbonization of vinyl chloride resin due to synergistic actions of titanium oxide and alumina and adsorption of smoke and gas by alumina at the time of combustion, so that it becomes possible to obtain a molding A having small values of all of the fire propagation index FPI, smoke damage index SDI and corrosion damage index CDI.

It is necessary to adjust the titanium oxide content within the range of from 5 to 50 parts by weight based on 100 parts by weight of the vinyl chloride resin, because it becomes difficult to obtain a fire-retardant vinyl chloride resin molding A having a fire propagation index FPI of 6 or less, a smoke damage index SDI of 0.4 or less and a corrosion damage index CDI of 1.1 or less, when the content is less than 5 parts by weight. On the other hand, when the titanium oxide content is larger than 50 parts by weight, moldability and mechanical strength become poor so that it is difficult to obtain a molding A having practical strength as an industrial material.

The titanium oxide content is more preferably within the range of from 8 to 30 parts by weight based on 100 parts by weight of the vinyl chloride resin, and a molding A having such a relatively small titanium oxide content shows excellent properties such as chemical resistance, mechanical strength, bending ability and coloring ability.

In addition, when a vinyl chloride resin having a chlorination degree of from 58% to 73% is used, the carbonization acceleration of titanium oxide is so large that a fire-retardant vinyl chloride resin molding A which can satisfy all of the criteria of FPI, SDI and CDI can be obtained even when the lower limit of the titanium oxide content is reduced to a range of from 4 to 30 parts by weight based on 100 parts by weight of the vinyl chloride resin. In this connection, the titanium oxide content of this case is more preferably from 8 to 20 parts by weight based on 100 parts by weight of the vinyl chloride resin.

Thickness of the aforementioned molding A is not particularly limited and can be optionally decided taking its use and other factors into consideration, but sufficiently practical strength can be obtained generally when its thickness is approximately from 3 to 15 mm.

The aforementioned fire-retardant vinyl chloride resin molding A having a single layer structure can be obtained by preparing a vinyl chloride resin composition in which titanium oxide is blended with other additives (such as a heat stabilizer, a lubricant, a processing auxiliary and a coloring agent) and molding the composition into a desired single layer shape such as a plate, a pipe, a rod and a welding rod and a profile such as an angle, by a known molding means such as melt extrusion molding, calender press and injection molding, and is suitably used in various applications, particularly semiconductor production apparatuses, as such or after its secondary processing.

Next, the second single layer structure fire-retardant vinyl chloride resin molding B of the present invention comprises from 5 to 50 parts by weight of titanium oxide based on 100 parts by weight of a vinyl chloride resin and at least one compounding agent selected from a chlorine capturing compound, an inorganic auxiliary and a fire retarding auxiliary in such an amount that the total content of titanium oxide and the compounding agent becomes 60 parts by weight or less.

The fire-retardant vinyl chloride resin molding B includes seven types of moldings based on the combination of compounding agents to be contained, namely a molding B1 which contains a chlorine capturing compound as the compounding agent, a molding B2 which contains an inorganic auxiliary as the compounding agent, a molding B3 which contains a chlorine capturing compound and an inorganic auxiliary as the compounding agent, a molding B4 which contains a fire retarding auxiliary as the compounding agent, a molding B5 which contains a chlorine capturing compound and a fire retarding auxiliary as the compounding agent, a molding B6 which contains an inorganic auxiliary and a fire retarding auxiliary as the compounding agent and a molding B7 which contains a chlorine capturing compound, an inorganic auxiliary and a fire retarding auxiliary as the compounding agent. Among them, moldings B1, B2, B3 and B4 are the main forms which are described in the following.

Firstly, the molding B1 contains titanium oxide in an amount of from 5 to 50 parts by weight based on 100 parts by weight of a vinyl chloride resin and a chlorine capturing compound as the compounding agent in such an amount that the total content of titanium oxide and the compounding agent becomes 60 parts by weight or less. As a matter of course, the molding B1 may also be blended with appropriate amount of additives necessary for the molding process, such as a lead based or tin based heat stabilizer, a lubricant, a processing auxiliary and a coloring agent.

When titanium oxide and a chlorine capturing compound are blended like the case of molding B1, fire-retardant property of the molding B1 is improved and the amount of smoke is reduced by the thermal shield action and carbonization acceleration action of titanium oxide, and the amount of generation of corrosive gases such as chlorine gas and hydrogen chloride gas is further reduced due to the effect of the chlorine capturing compound to capture the chlorine atoms released from the vinyl chloride resin at the time of its combustion, so that a molding B1 having small corrosion damage index CDI is obtained.

Carbonates are desirable as the chlorine capturing compound, and calcium carbonate, lithium carbonate or magnesium carbonate alone or a mixture thereof is preferably used. Among these compounds, calcium carbonate has superior chemical resistance in comparison with other compounds and therefore is used particularly preferably. These carbonates react with chlorine atoms released from the vinyl chloride resin at the time of its combustion and capture the greater part of chlorine atoms as a chloride such as calcium chloride, thereby reducing the amount of generated corrosive gases. Particularly, a carbonate in the form of powder having an average particle size of 0.5 $\mu$m or less, preferably 0.1 $\mu$m or less, has high reactivity with chlorine because of the large specific surface area and therefore is used most desirably. In this connection, compounds other than the just described carbonates, such as a tin compound, zeolite, barium sulfate, potassium titanate, a sodium compound, a magnesium compound, an aluminum compound and a lithium compound, can also be used.

Regarding the vinyl chloride resin and titanium oxide, similar materials used in the aforementioned molding A can be used. In particular, the aforementioned vinyl chloride resin having a chlorination degree of from 58% to 73% is used preferably.

It is necessary to use titanium oxide in an amount of from 5 to 50 parts by weight based on 100 parts by weight of the vinyl chloride resin similar to the case of the aforementioned molding A. Also, it is necessary to use the chlorine capturing compound in such an amount that the total content of titanium oxide and the compounding agent becomes 60 parts by weight or less based on 100 parts by weight of the vinyl chloride resin, illustratively, it is desirable to use the chlorine capturing compound within the range of from 5 to 30 parts by weight so that the total content becomes 60 parts by weight or less. When the total content is larger than 60 parts by weight, not only moldability becomes poor but also brittleness occurs, so that a molding B1 having practical strength cannot be obtained easily. Also, when the content of titanium oxide or chlorine capturing component is smaller than 5 parts by weight, fire-retardant property is hardly improved and capturing of chlorine is also insufficient, so that it becomes difficult to obtain a molding B1 which satisfies all criteria of the FM standard, particularly having small CDI. More preferred content of titanium oxide is from 5 to 25 parts by weight, more preferred content of the chlorine capturing compound is from 7 to 20 parts by weight, and more preferred total content of them is from 12 to 40 parts by weight.

Next, the molding B2 contains titanium oxide in an amount of from 5 to 50 parts by weight based on 100 parts by weight of a vinyl chloride resin and an inorganic auxiliary as the compounding agent in such an amount that the total content of titanium oxide and the compounding agent becomes 60 parts by weight or less, and the molding B2 may also be blended with appropriate amount of additives necessary for the molding process, such as a lead based or tin based heat stabilizer, a lubricant, a processing auxiliary and a coloring agent.

As the inorganic auxiliary, an inorganic agent which, together with titanium oxide, can increase fire-retardant property by reducing the ratio of the vinyl chloride resin as an organic substance occupying the total composition is used, particularly, at least one of silica, alumina, aluminum silicate and talc, which can markedly improve fire-retardant property by increasing carbonization acceleration action synergistically with titanium oxide, is used. Among these agents, alumina and aluminum silicate can also exert chlorine capturing action.

Regarding the vinyl chloride resin and titanium oxide, similar materials used in the aforementioned molding A can be used. In particular, the aforementioned vinyl chloride resin having a chlorination degree of from 58% to 73% is used preferably.

In the molding B2 in which the aforementioned inorganic auxiliary is used jointly with titanium oxide, the fire-retardant property is markedly improved by the considerably reduced occupying ratio of the vinyl chloride resin as an organic substance and by the synergistic carbonization acceleration action of titanium oxide and inorganic auxiliary, so that a molding particularly having small fire propagation index FPI and smoke damage index SDI is obtained.

It is necessary to use titanium oxide in an amount of from 5 to 50 parts by weight based on 100 parts by weight of the vinyl chloride resin similar to the case of the aforementioned molding B1. Also, it is necessary to use the inorganic auxiliary in such an amount that the total content of titanium oxide and the compounding agent becomes 60 parts by weight or less based on 100 parts by weight of the vinyl chloride resin, illustratively, it is desirable to use the inorganic auxiliary within the range of from 2 to 30 parts by weight so that the total content becomes 60 parts by weight or less. When the total content is larger than 60 parts by weight, not only moldability becomes poor but also brittleness occurs, so that a molding B2 having practical strength cannot be obtained easily. Also, when the titanium oxide content is smaller than 5 parts by weight or the inorganic auxiliary content is smaller than 2 parts by weight, the synergistic carbonization acceleration action of titanium oxide and inorganic auxiliary is not exerted sufficiently and improvement of fire-retardant property therefore is not so large, so that it becomes difficult to obtain the molding B2 which satisfies all of the criteria FPI, SDI and CDI. More preferred content of titanium oxide is from 5 to 25 parts by weight, more preferred content of the inorganic auxiliary is from 2 to 15 parts by weight, and more preferred total content of them is from 7 to 40 parts by weight.

Next, the molding B3 contains titanium oxide in an amount of from 5 to 50 parts by weight based on 100 parts by weight of a vinyl chloride resin and also contains a chlorine capturing compound and an inorganic auxiliary as the compounding agent in such amounts that the total content of titanium oxide and the compounding agent becomes 60 parts by weight or less, preferably, it contains from 5 to 30 parts by weight of a chlorine capturing compound and from 2 to 30 parts by weight of an inorganic auxiliary. In this connection, the molding B3 may also be blended with appropriate amount of additives necessary for the molding process, such as a lead based or tin based heat stabilizer, a lubricant, a processing auxiliary and a coloring agent.

Regarding the vinyl chloride resin, titanium oxide, chlorine capturing compound and inorganic auxiliary, similar materials used in the aforementioned moldings Ba and B2 can be used, so that their descriptions are not rep ea ted here.

When titanium oxide, a chlorine capturing compound and an inorganic auxiliary are jointly used like the case of this molding B3, the fire-retardant property is markedly improved because chlorine atoms released from the vinyl chloride resin at the time of combustion are captured by the chlorine capturing compound and because the increased synergistic carbonization acceleration action of titanium oxide and inorganic auxiliary, so that a molding which sufficiently satisfies all of the criteria, namely fire propagation index FPI, smoke damage index SDI and corrosion damage index CDI, is obtained. In addition, since the total content of titanium oxide, chlorine capturing compound and inorganic auxiliary is 60 parts by weight or less, reduction of moldability and reduction of mechanical strength of the molding B3 can be controlled within necessary limits. Preferred content of titanium oxide is from 5 to 25 parts by weight, preferred content of the chlorine capturing compound is from 7 to 20 parts by weight, preferred content of the inorganic auxiliary is from 2 to 15 parts by weight, and preferred total content of them is from 15 to 40 parts by weight.

Next, the molding B4 contains titanium oxide in an amount of from 5 to 50 parts by weight based on 100 parts by weight of a vinyl chloride resin and a fire retarding auxiliary as the compounding agent in such an amount that the total content of titanium oxide and the compounding agent becomes 60 parts by weight or less, and the molding B4 may also be blended with appropriate amount of additives necessary for the molding process, such as a lead based or tin based heat stabilizer, a lubricant, a processing auxiliary and a coloring agent.

Regarding the vinyl chloride resin and titanium oxide, similar materials used in the aforementioned moldings can be used. In particular, the aforementioned vinyl chloride resin having a chlorination degree of from 58% to 73% is used preferably. However, since fire-retardant property is improved by including a fire retarding auxiliary, the molding B4 which satisfies the FM standard can be obtained even if the chlorination degree is 50% or more and 58% or less. By this, the molding B4 having good chemical resistance can be obtained with low cost.

Regarding the fire retarding auxiliary, a zinc compound, a molybdenum compound and a phosphorus compound, which can increase the carbonization acceleration action synergistically with titanium oxide, are selected and used alone or as a mixture of two or more to be contained in a vinyl chloride resin. Examples of the zinc compound to be used include zinc stannate, zinc borate and an organic zinc compound, such as zinc stearate or zinc laurate. Also, examples of the molybdenum compound to be used include molybdenum oxide, calcium molybdate, zinc molybdate, calcium zinc molybdate and ammonium octamolybdate, and examples of the phosphorus compound to be used include a phosphoric acid ester, a halogen-containing phosphoric acid ester, a polyphosphoric acid salt and red phosphorus. Useful among these compounds are zinc stannate because of its superior heat resistance and chemical resistance and calcium zinc molybdate and zinc molybdate because of their superior chemical resistance and handling ability. Phosphoric esters are also useful because of their effect to reduce corrosion damage index CDI of the molding B4.

In the molding B4 in which at least one of the just described zinc compounds, molybdenum compounds and phosphorus compounds is contained as the fire retarding auxiliary in the vinyl chloride resin together with titanium oxide, its fire-retardant property is markedly improved because of the effect of titanium oxide to exert thermal shield action and carbonization acceleration action at the time of combustion and the effect of the fire retarding auxiliary to increase the carbonization acceleration action synergistically, so that a molding which has excellent fire-retardant property and satisfies all of FPI, SDI and CDI is obtained.

It is necessary to use titanium oxide in an amount of from 5 to 50 parts by weight based on 100 parts by weight of the vinyl chloride resin, and a molding B4 which satisfies all of the criteria of FM standard can be obtained within this range sufficiently and securely. However, since fire-retardant property is considerably improved when a fire retarding auxiliary is jointly used like the case of molding B4, a molding which satisfies all of the criteria of FM standard can be obtained in many cases even if the lower limit of titanium oxide content is reduced to 4 parts by weight. On the other hand, it is necessary to use the fire retarding auxiliary in such an amount that the total content of titanium oxide and the compounding agent becomes 60 parts by weight or less based on 100 parts by weight of the vinyl chloride resin, illustratively, it is desirable to use the fire retarding auxiliary within the range of from 1 to 10 parts by weight. Even with such a small content, the fire retarding auxiliary can sufficiently increase fire-retardant property synergistically with titanium oxide.

The titanium oxide content is preferably from 5 to 25 parts by weight, more preferably from 7 to 15 parts by weight, based on 100 parts by weight of the vinyl chloride resin, and the fire retarding auxiliary content is preferably from 3 to 7 parts by weight. Also, the total content of titanium oxide and fire retarding auxiliary is preferably from 8 to 30 parts by weight, and the molding B4 having such a small total content shows excellent moldability, chemical resistance and corrosion resistance and also has large mechanical strength.

Each of the aforementioned fire-retardant vinyl chloride resin moldings B1, B2, B3 and B4 having a single layer structure can be obtained by preparing a vinyl chloride resin composition in which titanium oxide is blended with at least one of a chlorine capturing compound, an inorganic auxiliary and a fire retarding auxiliary as the compounding agent and other additives (such as a heat stabilizer, a lubricant, a processing auxiliary and a coloring agent) and molding the composition into a desired single layer structure by a known molding means (such as melt extrusion molding, calender press and injection molding). Such moldings are suitably used in various applications, particularly in semiconductor production apparatuses, as such or after their secondary processing.

Next, the fire-retardant vinyl chloride resin molding of the present invention having a laminate structure comprises an integrated molding formed by laminating a surface layer on at least one side of a base layer and includes the following four types of moldings C, D, E and F based on the combination of the base layer and surface layer having different compositions.

Firstly, the molding C is an integrated molding formed by laminating a surface layer on at least one side of a base layer, wherein the base layer contains titanium oxide in an amount of from 5 to 50 parts by weight, preferably from 8 to 30 parts by weight, based on 100 parts by weight of a vinyl chloride resin, and the surface layer contains titanium oxide in an amount of from 0 to 30 parts by weight based on 100 parts by weight of the vinyl chloride resin so that its titanium oxide content becomes smaller than the titanium oxide content of the base layer. As a matter of course, the base layer and surface layer may be blended with appropriate amount of necessary additives such as a lead based or tin based heat stabilizer, a lubricant, a processing auxiliary and a coloring agent.

Since the titanium oxide content of the surface layer of the laminate layer structure molding C is from 0 to 30 parts by weight which is smaller than the titanium oxide content of the base layer, the surface of the molding (surface layer) shows good chemical resistance and corrosion resistance, the surface layer does not become brittle and fire-retardant property of the surface layer itself is improved by titanium oxide. In addition, since the base layer has the same composition of the aforementioned molding A having excellent fire-retardant property, the molding C as a whole shows excellent fire-retardant property, generates less smoke and corrosive gases and therefore satisfies all criteria of the fire propagation index FPI, smoke damage index SDI and corrosion damage index CDI.

When the titanium oxide content of the surface layer exceeds 30 parts by weight, fire-retardant property of the surface layer may be improved but the good chemical resistance and corrosion resistance inherent in the vinyl chloride resin cannot be maintained due to too reduced amount of vinyl chloride resin in the surface layer, and mechanical strength and bending ability of the surface layer are also reduced, so that it is necessary to set the titanium oxide content of the surface layer to a level of 30 parts by weight or less as described in the foregoing. It is possible to exclude titanium oxide from the surface layer, with the proviso that thickness of the surface layer is reduced and the titanium oxide content of the base layer is increased. The titanium oxide content of the surface layer is preferably from 0 to 20 parts by weight, more preferably from 3 to 15 parts by weight, based on 100 parts by weight of the vinyl chloride resin, and the surface layer containing such a small amount of titanium oxide shows good properties such as chemical resistance, corrosion resistance, mechanical strength and bending ability.

Regarding the vinyl chloride resin and titanium oxide, the same materials used in each of the aforementioned moldings are used, but it is particularly desirable to use a vinyl chloride resin having a chlorination degree of from 58% to 73% in the base layer and a vinyl chloride resin having a chlorination degree of 50% or more and less than 58% in the surface layer. The carbonization acceleration action of titanium oxide increases as the chlorination degree of vinyl chloride resin increases, but chemical resistance and corrosion resistance decrease as the chlorination degree of vinyl chloride resin increases, so that the base layer possesses more superior fire-retardant property and the surface layer possesses more excellent chemical resistance and corrosion resistance when a vinyl chloride resin having high chlorination degree is used in the base layer and a vinyl chloride resin having relatively low chlorination degree is used in the surface layer as described above.

A vinyl chloride resin having a chlorination degree of higher than 73% causes a difficulty in producing moldings, entails poor heat stability, moldability and bending ability and therefore is not desirable as the resin of base layer, and a vinyl chloride resin having a chlorination degree of lower than 58% shows not so great improvement of fire-retardant property and therefore is not desirable too. Also, as the resin of surface layer, a vinyl chloride resin having a chlorination degree of 58% or more is not desirable because chemical resistance and elongation are not so good and bending cannot be made easily, and a vinyl chloride resin having a chlorination degree of lower than 50% is not desirable because fire-retardant property cannot be improved without considerably increasing the titanium oxide content.

As the vinyl chloride resin having a chlorination degree of from 58% to 73%, any one of the resins described with regard to the molding A can be used suitably. On the other hand, as the vinyl chloride resin having a chlorination degree of 50% or more and less than 58%, a general vinyl chloride resin having a chlorination degree of about 56%, a vinyl chloride-vinyl acetate copolymer resin having a chlorination degree of 50 to 56% and a vinyl chloride-ethylene copolymer resin having a chlorination degree of 50 to 56% may be preferably used alone or as a mixture of two or more. Among these resins, a vinyl chloride resin having a chlorination degree of about 56% is used most preferably, because it has most superior chemical resistance and is a general-purpose resin.

In this connection, when a resin having a chlorination degree of from 58% to 73% is used as the vinyl chloride resin of base layer, improvement of fire-retardant property becomes significant because of the increased carbonization acceleration action of titanium oxide, so that a fire-retardant vinyl chloride resin molding C which satisfies all of the criteria of FPI, SDI and CDI can be obtained even if the lower limit of the titanium oxide content of base layer is further reduced to a level of from 4 to 30 parts by weight based on 100 parts by weight of the vinyl chloride resin.

Since the surface layer is employed for the purpose of improving chemical resistance and corrosion resistance of the molding C, it is desirable to form it on both sides of the base layer, but it may be formed one side of the base layer. In that case, it is desirable that the base layer has a thickness of approximately from 2 to 12 mm so that its practical strength can be obtained, and the surface layer has a thickness of from 0.2 to 1.6 mm. When the surface layer is formed into a thickness of smaller than 0.2 mm, its initial chemical resistance and corrosion resistance may be good, but chemicals penetrate into the surface layer and reach the base layer after a prolonged period of time, which is not desirable. On the contrary, when it is formed into a thickness of larger than 1.6 mm, fire-retardant property is reduced because volumetric ratio of the surface layer to the entire molding C increases and volumetric ratio of the base layer decreases as the result, so that it becomes difficult to obtain a molding which stably satisfies each criterion of the FM standard. More preferred thickness of the surface layer is from 0.4 to 1.1 mm.

The fire-retardant vinyl chloride resin molding C having the aforementioned laminate structure is produced by preparing a vinyl chloride resin composition for base layer formation use in which titanium oxide is blended with other additives (such as a heat stabilizer, a lubricant, a processing auxiliary and coloring agent) (preferably a vinyl chloride resin composition having a chlorination degree of from 58% to 73%) and a vinyl chloride resin composition for surface layer formation use in which the titanium oxide content is smaller than the former composition (preferably a vinyl chloride resin composition having a chlorination degree of 50% or more and less than 58%), and forming these compositions into a desired laminate form by multiple layer extrusion molding, calender press, extrusion laminating, injection molding or other means. The molding C obtained in this manner satisfies all of the criteria FPI, SDI and CDI of the FM standard and also has good chemical resistance and corrosion resistance of the surface, so that it can be used suitably in those applications which require certain properties such as chemical resistance, for example as a material of a washing vessel which is a part of semiconductor production apparatus.

Next, the fire-retardant vinyl chloride resin molding D having a laminate structure as another mode of the present invention is an integrated molding formed by laminating a surface layer on at least one side of a base layer, wherein the base layer contains titanium oxide in an amount of from 5 to 50 parts by weight based on 100 parts by weight of a vinyl chloride resin and at least one compounding agent selected from a chlorine capturing compound, an inorganic auxiliary and a fire retarding auxiliary in such an amount that the total content of titanium oxide and the compounding agent becomes 60 parts by weight or less, and the surface layer contains titanium oxide in an amount of from 0 to 30 parts by weight (preferably from 0 to 20 parts by weight, more preferably from 3 to 15 parts by weight) based on 100 parts by weight of the vinyl chloride resin so that its titanium oxide content becomes smaller than the titanium oxide content of the base layer. As a matter of course, the base layer and surface layer may also be blended with appropriate amount of necessary additives such as a lead based or tin based heat stabilizer, a lubricant, a processing auxiliary and a coloring agent.

Since the surface layer of this molding D is the same as the surface layer of the aforementioned laminate C, its description is not repeated here.

On the other hand, the base layer of the molding D includes the following 7 types based on the combination of titanium oxide with jointly used compounding agents.

The first base layer is a layer which has the same composition of the aforementioned molding B1 in which a chlorine capturing compound is used as the compounding agent, and it contains titanium oxide in an amount of from 5 to 50 parts by weight (preferably from 5 to 25 parts by weight) and a chlorine capturing compound in an amount of preferably from 5 to 30 parts by weight, based on 100 parts by weight of the vinyl chloride resin, so that the total content of titanium oxide and chlorine capturing compound becomes 60 parts by weight or less.

The second base layer is a layer which has the same composition of the aforementioned molding B2 in which an inorganic auxiliary is used as the compounding agent, and it contains titanium oxide in an amount of from 5 to 50 parts by weight (preferably from 5 to 25 parts by weight) and an inorganic auxiliary in an amount of preferably from 2 to 30 parts by weight, based on 100 parts by weight of the vinyl chloride resin, so that the total content of titanium oxide and inorganic auxiliary becomes 60 parts by weight or less.

The third base layer is a layer which has the same composition of the aforementioned molding B3 in which a chlorine capturing compound and an inorganic auxiliary are used as the compounding agent, and it contains titanium oxide in an amount of from 5 to 50 parts by weight (preferably from 5 to 25 parts by weight), a chlorine capturing compound in an amount of preferably from 5 to 30 parts by weight and an inorganic auxiliary in an amount of preferably from 2 to 30 parts by weight, based on 100 parts by weight of the vinyl chloride resin, so that the total content of titanium oxide, chlorine capturing compound and inorganic auxiliary becomes 60 parts by weight or less.

The fourth base layer is a layer which has the same composition of the aforementioned molding B4 in which a fire retarding auxiliary is used as the compounding agent, and it contains titanium oxide in an amount of from 5 to 50 parts by weight (preferably from 5 to 25 parts by weight) and a fire retarding auxiliary in an amount of preferably from 1 to 10 parts by weight, based on 100 parts by weight of the vinyl chloride resin, so that the total content of titanium oxide and fire retarding auxiliary becomes 60 parts by weight or less.

The fifth base layer contains a chlorine capturing compound and a fire retarding auxiliary, the sixth base layer contains an inorganic auxiliary and a fire retarding auxiliary and the seventh base layer contains a chlorine capturing compound and an inorganic auxiliary, each as the compounding agent in such an amount that the total content of titanium oxide and compounding agent becomes 60 parts by weight or less based on 100 parts by weight of the vinyl chloride resin.

In this laminate D, it is desirable to use the aforementioned vinyl chloride resin having a chlorination degree of from 58% to 73% as the resin of base layer, and the aforementioned vinyl chloride resin having a chlorination degree of 50% or more and less than 58% as the resin of surface layer. Regarding its components such as titanium oxide, chlorine capturing compounds, inorganic auxiliaries and fire retarding auxiliaries, the same materials used in the aforementioned moldings are used.

The base layer is set to a thickness of preferably from 2 to 12 mm similar to the case of the aforementioned molding C, and the surface layer is set to a thickness of preferably from 0.2 to 1.6 mm, more preferably from 0.4 to 1.1 mm, similar to the case of the aforementioned molding C.

Similar to the case of the aforementioned molding C, the titanium oxide content of the surface layer of the laminate layer structure molding D is from 0 to 30 parts by weight which is smaller than the titanium oxide content of the base layer, so that the surface of the molding (surface layer) shows good chemical resistance and corrosion resistance, and fire-retardant property of the surface layer is improved by titanium oxide without causing brittleness of the surface layer. In addition, since the base layer has the same composition of the aforementioned molding B (such as B1, B2, B3 and B4) having excellent fire-retardant property, the molding D as a whole shows excellent fire-retardant property, generates less smoke and corrosive gases and therefore satisfies all criteria of the FM standard.

Next, the fire-retardant vinyl chloride resin molding E having a laminate structure as still another mode of the present invention is an integrated molding formed by laminating a surface layer on at least one side of a base layer, wherein the base layer contains titanium oxide in an amount of from 5 to 50 parts by weight (preferably from 8 to 30 parts by weight) based on 100 parts by weight of a vinyl chloride resin, and the surface layer contains titanium oxide in an amount of from 0 to 30 parts by weight so that its titanium oxide content becomes smaller than the titanium oxide content of the base layer and at least one compounding agent selected from a chlorine capturing compound, an inorganic auxiliary and a fire retarding auxiliary in such an amount that the total content of titanium oxide and the compounding agent becomes 40 parts by weight or less, based on 100 parts by weight of the vinyl chloride resin. As a matter of course, the base layer and surface layer may also be blended with appropriate amount of necessary additives such as a lead based or tin based heat stabilizer, a lubricant, a processing auxiliary and a coloring agent.

Since the base layer of this molding E is the same as the base layer of the aforementioned laminate C, its description is not repeated here.

On the other hand, the surface layer of the molding E includes 7 types based on the combination of titanium oxide with jointly used compounding agents. When titanium oxide and a chlorine capturing compound are used, the surface layer contains titanium oxide in an amount of from 0 to 30 parts by weight (preferably from 3 to 15 parts by weight), and the chlorine capturing compound in an amount of from 2 to 30 parts by weight (preferably from 3 to 15 parts by weight), based on 100 parts by weight of the vinyl chloride resin, so that the total content becomes 40 parts by weight or less (preferably from 6 to 30 parts by weight). When titanium oxide and an inorganic auxiliary are used, it contains titanium oxide in an amount of from 0 to 30 parts by weight (preferably from 3 to 15 parts by weight), and the inorganic auxiliary in an amount of from 2 to 30 parts by weight (preferably from 2 to 15 parts by weight), so that the total content becomes 40 parts by weight or less. Also, when titanium oxide and a fire retarding auxiliary are used, it contains titanium oxide in an amount of preferably from 4 to 30 parts by weight, and the fire retarding auxiliary in an amount of preferably from 1 to 10 parts by weight. In addition, when a chlorine capturing compound and an inorganic auxiliary are used, a chlorine capturing compound and a fire retarding auxiliary is used, an inorganic auxiliary and a fire retarding auxiliary are used or a chlorine capturing compound and an inorganic auxiliary are used, each as the compounding agent, the content of each compounding agent is decided such that the total content of titanium oxide and compounding agent becomes 40 parts by weight or less.

As described in the above, it is necessary to adjust the total content of titanium oxide and compounding agent in the surface layer to 40 parts by weight or less based on 100 parts by weight of the vinyl chloride resin, because, when the total content exceeds 40 parts by weight, the occupying ratio of vinyl chloride resin in the surface layer becomes too small so that it becomes difficult to provide the surface layer with the good chemical resistance and corrosion resistant inherent in the vinyl chloride resin, and the surface layer will become brittle.

Also in the case of this molding E, it is desirable to use the aforementioned vinyl chloride resin having a chlorination degree of from 58% to 73% as the resin of base layer, and the aforementioned vinyl chloride resin having a chlorination degree of 50% or more and less than 58% as the resin of surface layer, and it is also desirable to set the base layer to a thickness of from 2 to 12 mm, and the surface layer to a thickness of from 0.2 to 1.6 mm (more preferably from 0.4 to 1.1 mm).

In such laminate structure molding E, the titanium oxide content of the surface layer is smaller than the titanium oxide content of the base layer, and the total content of titanium oxide and compounding agent is also set to a smaller value of 40 parts by weight or less, so that the surface of the molding (surface layer) shows good chemical resistance and corrosion resistance and also shows good elongation and bending ability without causing brittleness of the surface layer. In addition, since the base layer has the same composition of the aforementioned molding A having excellent fire-retardant property, and fire-retardant property of the surface layer is also improved by titanium oxide and the compounding agent contained in small amounts therein, the molding E as a whole shows excellent fire-retardant property, generates less smoke and corrosive gases and therefore satisfies all criteria of the FM standard.

Next, the fire-retardant vinyl chloride resin molding F having a laminate structure as another mode of the present invention is an integrated molding formed by laminating a surface layer on at least one side of a base layer, wherein the base layer contains titanium oxide in an amount of from 5 to 50 parts by weight based on 100 parts by weight of a vinyl chloride resin and at least one compounding agent selected from a chlorine capturing compound, an inorganic auxiliary and a fire retarding auxiliary in such an amount that the total content of titanium oxide and the compounding agent becomes 60 parts by weight or less, and the surface layer contains titanium oxide in an amount of from 0 to 30 parts by weight based on 100 parts by weight of the vinyl chloride resin so that its titanium oxide content becomes smaller than the titanium oxide content of the base layer and also contains at least one compounding agent selected from a chlorine capturing compound, an inorganic auxiliary and a fire retarding auxiliary in such an amount that the total content of titanium oxide and the compounding agent becomes 40 parts by weight or less and also becomes smaller than the total content of the base layer. As a matter of course, the base layer and surface layer may also be blended with appropriate amount of necessary additives such as a lead based or tin based heat stabilizer, a lubricant, a processing auxiliary and a coloring agent.

Since the base layer of this molding F is the same as the base layer of the aforementioned molding D and the surface layer of this molding F is the same as the surface layer of the aforementioned molding E, their descriptions are not repeated here. However, when a fire retarding auxiliary is used as the compounding agent in the surface layer, it is desirable to set its content within the range of from 0 to 8 parts by weight (preferably from 2 to 7 parts by weight) based on 100 parts by weight of the vinyl chloride resin. In the aforementioned molding E, the fire retarding auxiliary in its surface layer is used in an amount of preferably from 1 to 10 parts by weight, because its base layer contains titanium oxide in an amount of from 5 to 50 parts by weight, but, in the case of the base layer of molding F, its fire-retardant property is further improved by jointly using from 5 to 50 parts by weight of titanium oxide with such an amount of the compounding agent that their total content becomes 60 parts by weight, so that excellent fire-retardant property which sufficiently satisfies each criterion of the FM standard as the whole molding F can be obtained even if the fire retarding auxiliary content of the surface layer is further reduced to the just described level of from 0 to 8 parts by weight.

In this connection, also in the case of this molding F, it is desirable to use the aforementioned vinyl chloride resin having a chlorination degree of from 58% to 73% as the resin of base layer, and the aforementioned vinyl chloride resin having a chlorination degree of 50% or more and less than 58% as the resin of surface layer, and it is also desirable to set the base layer to a thickness of from 2 to 12 mm, and the surface layer to a thickness of from 0.2 to 1.6 mm (more preferably from 0.4 to 1.1 mm).

In such laminate structure molding F, the titanium oxide content of the surface layer is smaller than the titanium oxide content of the base layer, and the total content of titanium oxide and compounding agent is also set to a smaller value of 40 parts by weight or less, its titanium oxide content becomes smaller than the titanium oxide content of the base layer so that the surface of the molding (surface layer) shows good chemical resistance and corrosion resistance and also shows good elongation and bending ability without causing brittleness of the surface layer. In addition, since the base layer has the same composition of the aforementioned molding D having excellent fire-retardant property, and fire-retardant property of the surface layer is also improved by titanium oxide and the compounding agent contained in small amounts therein, the molding F as a whole shows excellent fire-retardant property, generates less smoke and corrosive gases and therefore satisfies all criteria of the FM standard.

In this connection, these moldings D, E and F can be produced easily similar to the case of the molding C, by preparing a vinyl chloride resin composition for base layer formation use and a vinyl chloride resin composition for surface layer formation use, and forming these compositions into a desired shape by multiple layer extrusion molding, calender press, extrusion laminating, injection molding or other means.

Each of the laminate structure moldings C, D, E and F described in the foregoing is a laminate structure molding of two or three layers, in which a surface layer is laminated on one side or both sides of a base layer, but it may be formed into a molding of multiple layer laminate structure for example by alternately laminating a layer having the same composition of the base layer and a layer having the same composition of the surface layer. In that case, it is desirable to set each layer to a thickness of approximately from 0.2 to 1.5 mm so that total thickness of the molding becomes approximately from 3 to 15 mm.

Examples of the present invention are given below by way of illustration and not by way of limitation.

EXAMPLES 1 to 3

Four parts by weight of a lead based stabilizer, 2 parts by weight of a lubricant and 4 parts by weight of a processing auxiliary were added to 100 parts by weight of a commercially available vinyl chloride resin (chlorination degree, 56.8%) and uniformly mixed to produce a basal formulation composition. Titanium oxide coated with alumina (average particle size: about 0.2 μm or less) was uniformly contained in 110 parts by weight of the basal formulation composition in an amount of 15 parts by weight (Example 1), 25 parts by weight (Example 2) or 35 parts by weight (Example 3) as shown in Table 1 to produce a calender sheet of 0.5 mm in thickness, and then 10 of the thus obtained sheets were piled up and pressed to obtain three types of single layer structure fire-retardant vinyl chloride resin plates (5 mm in thickness) whose titanium oxide content was different from one another.

These resin plates of Examples 1 to 3 were subjected to the fire-retardant property test of Class Number 4910 to measure fire propagation index FPI, smoke damage index SDI and corrosion damage index CDI, and their mechanical strengths (Izod impact strength, tensile strength and elongation) and resistance against chemicals (97% sulfuric acid, 35% sulfuric acid and 28% aqueous ammonia) were also examined. The results are shown in Table 1. I this case, each of the mechanical strengths was measured in accordance with the procedure of JIS K6745, and the chemical resistance was examined by soaking each sample in each chemical solution at 23° C. for 7 days and then observing its apparent discoloration which was expressed by a symbol ◉ as no discoloration, ○ as slight discoloration, Δ as discoloration or × as significant discoloration.

EXAMPLE 4

Calender sheets were produced in the same manner as described in Examples 1 to 3 by blending 110 parts by weight of the basal formulation composition produced in Examples 1 to 3 with 15 parts by weight of the titanium oxide used in Examples 1 to 3 and 20 parts by weight of calcium carbonate as a chlorine capturing compound and then the sheets were pressed to obtain a single layer structure fire-retardant vinyl chloride resin plate (5 mm in thickness). Thereafter, FPI, SDI and CDI of this plate were measured and its mechanical strength and chemical resistance were examined in the same manner as described in Examples 1 to 3. The results are shown in Table 1.

EXAMPLE 5

Calender sheets were produced in the same manner as described in Invention Examples 1 to 3 by blending 110 parts by weight of the basal formulation composition produced in Examples 1 to 3 with 15 parts by weight of the titanium oxide used in Examples 1 to 3 and 20 parts by weight of talc as an inorganic auxiliary and then the sheets were pressed to obtain a single layer structure fire-retardant vinyl chloride resin plate (5 mm in thickness). Thereafter, FPI, SDI and CDI of this plate were measured and its mechanical strength and chemical resistance were examined in the same manner as described in Examples 1 to 3. The results are shown in Table 1.

Comparative Examples 1 and 2

Two types of vinyl chloride resin plates were produced in the same manner as described in Examples 1 to 3, except that the titanium oxide content was changed to 4 parts by weight (Comparative Example 1) or 55 parts by weight (Comparative Example 2), and FPI, SDI and CDI of these plates were measured and their mechanical strength and chemical resistance were examined. The results are also shown in Table 1.

TABLE 1

|  | Example | | | | | Comparative Example | |
| --- | --- | --- | --- | --- | --- | --- | --- |
|  | 1 | 2 | 3 | 4 | 5 | 1 | 2 |
| Composition (parts by weight) | | | | | | | |
| Basal formulation composition | 110 | 110 | 110 | 110 | 110 | 110 | 110 |
| Titanium oxide | 15 | 25 | 35 | 15 | 15 | 4 | 55 |
| Chlorine capturing compound | — | — | — | 20 | — | — | — |
| Talc | — | — | — | — | 20 | — | — |
| Fire-retardant property | | | | | | | |
| FPI | 2.1 | 1.8 | 1.4 | 1.9 | 1.9 | 7.0 | 1.0 |
| SDI | 0.1 | 0.07 | 0.04 | 0.09 | 0.08 | 0.4 | 0.03 |
| CDI | 1.0 | 0.9 | 0.8 | 0.6 | 0.8 | 4.0 | 0.1 |
| Strength | | | | | | | |
| Izod impact strength (kg · cm/cm$^2$) | 7.0 | 6.5 | 5.5 | 5.5 | 5.2 | 6.0 | 3.0 |
| Tensile strength (kg/mm$^2$) | 5.0 | 4.8 | 4.0 | 4.5 | 4.7 | 5.5 | 5.0 |
| Elongation (%) | 150 | 100 | 80 | 80 | 70 | 180 | 10 |
| Chemical resistance | | | | | | | |
| 97% Sulfuric acid | ○ | Δ | Δ | Δ | Δ | ◉ | X |
| 35% Sulfuric acid | ◉ | ○ | Δ | Δ | ○ | ◉ | X |
| 28% Aqueous ammonia | ◉ | ◉ | ○ | ○ | ○ | ◉ | Δ |

It can be understood from Table 1 that each of the single layer structure fire-retardant vinyl chloride resin plates of Examples 1 to 3 in which 15 parts by weight, 25 parts by weight and 35 parts by weight of titanium oxide was respectively used can satisfy the FM standard of 6 or less in FPI, 0.4 or less in SDI and 1.1 or less in CDI, and that FPI, SDI and CDI are reduced as the titanium oxide content increases. Also, the single layer structure fire-retardant vinyl chloride resin plate of Example 4 in which 15 parts by weight of titanium oxide and 20 parts by weight of the chlorine capturing compound were used also satisfied the FM standard, and CDI was particularly reduced to 0.6 due to the use of the chlorine capturing compound. In addition, the single layer structure fire-retardant vinyl chloride resin plate of Example 5 in which 15 parts by weight of titanium oxide and 20 parts by weight of the inorganic auxiliary were used also satisfied the FM standard at the same levels of the case of 25 parts by weight titanium oxide.

On the contrary, the vinyl chloride resin plate of Comparative Example 1 having smaller titanium oxide content showed good chemical resistance in comparison with the fire-retardant vinyl chloride resin plates of Examples 1 to 3, but it did not satisfy the FM standard, because its FPI and CDI were over the critical values. Also, the vinyl chloride resin plate of Comparative Example 2 having excess titanium oxide content showed good fire-retardant property which can clear the FM standard sufficiently, but its impact strength, elongation and chemical resistance were evidently inferior to the fire-retardant vinyl chloride resin plates of Examples 1 to 5, thus showing that this plate can hardly be applied to practical use because of its poor workability.

Unless otherwise indicated, all parts are by weight based on 100 parts by weight of vinyl chloride resin.

EXAMPLE 6

A composition for base layer use was produced by blending 110 parts by weight of the basal formulation composition produced in Examples 1 to 3 with 15 parts by weight of titanium oxide and 20 parts by weight of calcium carbonate as a chlorine capturing compound. Also, a composition for surface layer use was produced by blending 110 parts by weight of the basal formulation composition produced in Examples 1 to 3 with 4 parts by weight of titanium oxide.

Calender sheets (0.5 mm in thickness) of these composition for base layer use and composition for surface layer use were respectively produced, laminated and then pressed to obtain a fire-retardant vinyl chloride resin plate of three layer structure (5 mm in total thickness) having a surface layer of 0.5 mm in thickness on both sides of a base layer of 4 mm in thickness. Thereafter, FPI, SDI and CDI of this resin plate were measured and its mechanical strength and chemical resistance were examined. The results are shown in Table 2.

EXAMPLE 7

A composition for base layer use was produced by blending 110 parts by weight of the basal formulation composition produced in Examples 1 to 3 with 25 parts by weight of titanium oxide. Also, a composition for surface layer use was produced by blending 110 parts by weight of the basal formulation composition produced in Examples 1 to 3 with 15 parts by weight of titanium oxide.

Calender sheets (0.5 mm in thickness) of these composition for base layer use and composition for surface layer use were respectively produced, laminated and then pressed to obtain a fire-retardant vinyl chloride resin plate of three layer structure (5 mm in total thickness) having a surface layer of 0.5 mm in thickness on both sides of a base layer of 4 mm in thickness. Thereafter, FPI, SDI and CDI of this resin plate were measured and its mechanical strength and chemical resistance were examined. The results are shown in Table 2.

EXAMPLE 8

A composition for base layer use was produced by blending 110 parts by weight of the basal formulation composition produced in Examples 1 to 3 with 25 parts by weight of titanium oxide. Also, a composition for surface layer use was produced by blending 110 parts by weight of the basal formulation composition produced in Examples 1 to 3 with 8 parts by weight of titanium oxide and 8 parts by weight of calcium carbonate as a chlorine capturing compound.

Calender sheets (0.5 mm in thickness) of these composition for base layer use and composition for surface layer use were respectively produced, laminated and then pressed to obtain a fire-retardant vinyl chloride resin plate of three layer structure (5 mm in total thickness) having a surface layer of 0.5 mm in thickness on both sides of a base layer of 4 mm in thickness. Thereafter, FPI, SDI and CDI of this resin plate were measured and its mechanical strength and chemical resistance were examined. The results are shown in Table 2.

Comparative Example 3

A composition for base layer use was produced by blending 110 parts by weight of the basal formulation composition produced in Examples 1 to 3 with 4 parts by weight of titanium oxide. A calender sheet (0.5 mm in thickness) of this composition for base layer use and another calender sheet (0.5 mm in thickness) of the basal formulation composition produced in Examples 1 to 3 were respectively produced, laminated and then pressed to obtain a vinyl chloride resin plate of three layer structure (5 mm in total thickness) having a titanium oxide-free surface layer of 0.5 mm in thickness on both sides of a base layer of 4 mm in thickness. Thereafter, FPI, SDI and CDI of this vinyl chloride resin plate were measured and its mechanical strength and chemical resistance were examined. The results are shown in Table 2.

TABLE 2

|  | Example | | | Comparative Example |
| --- | --- | --- | --- | --- |
|  | 6 | 7 | 8 | 3 |
| Composition (parts by weight) | | | | |
| Base layer | | | | |
| Basal formulation composition | 110 | 110 | 110 | 110 |
| Titanium oxide | 15 | 25 | 25 | 4 |
| Chlorine capturing compound | 20 | — | — | — |
| Surface layer | | | | |
| Basal formulation composition | 110 | 110 | 110 | 110 |
| Titanium oxide | 4 | 15 | 8 | — |
| Chlorine capturing compound | — | — | 8 | — |
| Fire-retardant property | | | | |
| FPI | 4.6 | 2.0 | 2.0 | 8.0 |
| SDI | 0.3 | 0.1 | 0.1 | 0.5 |
| CDI | 0.9 | 0.9 | 0.7 | 7.0 |
| Strength | | | | |
| Izod impact strength (kg · cm/cm$^2$) | 6.0 | 6.5 | 6.0 | 5.8 |
| Tensile strength (kg/mm$^2$) | 5.1 | 4.9 | 4.9 | 5.5 |
| Elongation (%) | 160 | 110 | 100 | 180 |
| Chemical strength | | | | |
| 97% Sulfuric acid | ◎ | ○ | ○ | ◎ |
| 35% Sulfuric acid | ◎ | ◎ | ◎ | ◎ |
| 28% Aqueous ammonia | ◎ | ◎ | ◎ | ◎ |

It is evident from Table 2 that all of the surface layer-formed fire-retardant vinyl chloride resin plates of Examples 5 to 7 satisfied the FM standard, and their chemical resistance was improved by the surface layer. On the contrary, the resin plate of Comparative Example 3 in which surface layers were formed on both sides of a base layer having insufficient titanium oxide content showed excellent chemical resistance but its FPI, SDI and CDI were significantly larger than the criteria so that it did not come up to the FM standard.

EXAMPLES 9 TO 11

Calender sheets (0.5 mm in thickness) were produced by uniformly mixing 100 parts by weight of a post-chlorinated vinyl chloride resin having a chlorination degree of 65% with alumina-coated titanium oxide (average particle size: about 0.2 Mm or less), a lead based stabilizer, a lubricant and a processing auxiliary according to the blending ratio shown in Table 3, and then 10 of the sheets were piled up and pressed to obtain single layer structure fire-retardant vinyl chloride resin plates (5 mm in thickness). Thereafter, FPI, SDI and CDI of these resin plates were measured and their mechanical strength and chemical resistance were examined. The results are shown in Table 3.

EXAMPLE 12

A resin mixture having an average chlorination degree of 60.9% was produced by blending 50 parts by weight of a post-chlorinated vinyl chloride resin having a chlorination degree of 65% with 50 parts by weight of a general vinyl chloride resin having a chlorination degree of 56.8%, and a calender sheet was produced by uniformly mixing 100 parts by weight of the resin mixture with titanium oxide, a lead based stabilizer, a lubricant and a processing auxiliary according to the blending ratio shown in Table 3 and then pressed to obtain single layer structure fire-retardant vinyl chloride resin plates of Example 12 (5 mm in thickness). Thereafter, FPI, SDI and CDI of this resin plate were measured and its mechanical strength and chemical resistance were examined. The results are shown in Table 3.

Comparative Example 4

A single layer structure vinyl chloride resin plate (5 mm in thickness) was produced in the same manner as described in Examples 8 to 10, except that the blending amount of titanium oxide was changed to 2 parts by weight. Thereafter, FPI, SDI and CDI of this resin plate were measured and its mechanical strength and chemical resistance were examined. The results are shown in Table 3.

Comparative Example 5

A calender sheet was produced by uniformly mixing 100 parts by weight of a general vinyl chloride resin having a chlorination degree of 56.8% with a lead based stabilizer, a lubricant, a processing auxiliary, calcium carbonate and talc according to the blending ratio shown in Table 3, and then pressed to obtain a single layer structure vinyl chloride resin plate (5 mm in thickness). Thereafter, FPI, SDI and CDI of this resin plate were measured and its mechanical strength and chemical resistance were examined. The results are shown in Table 3. In this case, the results of Comparative Example 1 shown in Table 1 were also included in Table 3 for the sake of facilitating comparison with Examples 9 to 11.

EXAMPLE 13

A calender sheet for base layer use having the same composition of Example 8 and a calender sheet for surface layer use having the same composition of Comparative Example 1 were produced, and these sheets were piled up and pressed to obtain a fire-retardant vinyl chloride resin plate of three layer structure (5 mm in total thickness) having a surface layer of 0.5 mm in thickness on both sides of a base layer of 4 mm in thickness. Thereafter, FPI, SDI and CDI of this resin plate were measured and its mechanical strength and chemical resistance were examined. The results are shown in Table 3.

EXAMPLE 14

A calender sheet for high chlorination degree resin layer use having the same composition of Example 10 and a calender sheet for low chlorination degree resin layer use having the same composition of Comparative Example 1 were produced, a large number of these calender sheets were alternately piled up in such a manner that the calender sheet for low chlorination degree resin layer use is arranged on both sides of the resulting laminate and then the laminate was pressed to obtain a fire-retardant vinyl chloride resin plate of multiple layer structure having a total thickness of 5 mm. Thereafter, FPI, SDI and CDI of this resin plate were measured and its mechanical strength and chemical resistance were examined. The results are shown in Table 3.

TABLE 3

|  | Example | | | | Comparative Example | | | Example | |
| --- | --- | --- | --- | --- | --- | --- | --- | --- | --- |
|  | 9 | 10 | 11 | 12 | 4 | 1 | 5 | 13 | 14 |
| Composition (parts by weight) | | | | | | | | | |
| Post-chlorinated PVC (chlorination degree, 65%) | 100 | 100 | 100 | 50 | 100 | — | — | *1 | *2 |
| PVC (chlorination degree, 56.8%) | — | — | — | 50 | — | 100 | 100 | | |
| Lead based stabilizer | 8 | 8 | 8 | 8 | 8 | 4 | 4 | | |
| Lubricant | 2 | 2 | 2 | 2 | 2 | 2 | 2 | | |

TABLE 3-continued

|  | Example | | | | Comparative Example | | | Example | |
| --- | --- | --- | --- | --- | --- | --- | --- | --- | --- |
|  | 9 | 10 | 11 | 12 | 4 | 1 | 5 | 13 | 14 |
| Processing auxiliary | 5 | 5 | 5 | 5 | 5 | 5 | 5 | | |
| Titanium oxide | 10 | 15 | 25 | 20 | 2 | 4 | — | | |
| Calcium carbonate | — | — | — | — | — | — | 40 | | |
| Talc | — | — | — | — | — | — | 40 | | |
| Fire-retardant property | | | | | | | | | |
| FPI | 1.2 | 1.0 | 0.7 | 2.5 | 4.0 | 7.0 | 3.0 | 4.1 | 2.0 |
| SDI | 0.02 | 0.01 | 0.01 | 0.1 | 0.3 | 0.4 | 0.3 | 0.2 | 0.2 |
| CDI | 0.8 | 0.6 | 0.4 | 0.8 | 2.4 | 4.0 | 1.1 | 0.6 | 0.4 |
| Strength | | | | | | | | | |
| Izod impact strength (kg · cm/cm$^2$) | 7.4 | 7.6 | 7.5 | 7.2 | 5.5 | 6.0 | 2.2 | 7.0 | 7.6 |
| Tensile strength (kg/mm$^2$) | 5.2 | 5.3 | 5.5 | 5.0 | 4.8 | 5.5 | 2.8 | 5.2 | 5.4 |
| Elongation (%) | 115 | 100 | 80 | 130 | 140 | 180 | 11 | 120 | 150 |
| Chemical resistance | | | | | | | | | |
| 97% Sulfuric acid | ◎ | ○ | ○ | ○ | ◎ | ◎ | X | ◎ | ◎ |
| 35% Sulfuric acid | ◎ | ◎ | ○ | ◎ | ◎ | ◎ | X | ◎ | ◎ |
| 28% Aqueous ammonia | ◎ | ◎ | ◎ | ◎ | ◎ | ◎ | ○ | ◎ | ◎ |

*1: A resin plate obtained by laminating a surface layer having the same composition of Comparative Example 5 on both sides of a base layer having the same composition of Example 8.
*2: A resin plate obtained by alternately laminating a high chlorination degree resin layer having the same composition of Example 10 and a low chlorination degree resin layer having the same composition of Comparative Example 5.

As is evident from Table 3, each of the fire-retardant vinyl chloride resin plates of Examples 9 to 11 in which 100 parts by weight of a post-chlorinated vinyl chloride resin having a chlorination degree of 65% was blended with 10 to 25 parts by weight of titanium oxide was possessed of excellent fire-retardant property which satisfies each criterion of the FM standard, because FPI was within the range of from 0.7 to 1.2, SDI was within the range of from 0.01 to 0.02 and CDI was within the range of from 0.4 to 0.8. It is evident also that fire-retardant property of the resin plate is improved as the titanium oxide content increases, and chemical resistance of the resin plate increases as the titanium oxide content decreases. In addition, in the case of the fire-retardant vinyl chloride resin plate of Example 12 in which a resin mixture of a post-chlorinated vinyl chloride resin having a chlorination degree of 65% and a general vinyl chloride resin was blended with titanium oxide, its FPI, SDI and CDI are slightly inferior to those of the resin plates of Examples 9 to 11 due to the presence of the general vinyl chloride resin but still satisfy each criterion sufficiently, and improvement of its elongation is particularly remarkable.

On the contrary, each of the vinyl chloride resin plates of Comparative Examples 4 and 1, respectively having smaller titanium content of 2 parts by weight and 4 parts by weight, has excellent chemical resistance and elongation but its CDI overruns the critical value, and, particularly in the case of the resin plate of Comparative Example 1, the titanium oxide content is larger than that of the resin plate of Comparative Example 4, but its fire-retardant property is inferior and its FPI also overruns the critical value because of the low chlorination degree. These results show that the general vinyl chloride resin exerts weak synergistic action with titanium oxide in comparison with the post-chlorinated vinyl chloride resin having high chlorination degree so that it cannot provide sufficient fire-retardant property when only a small amount of titanium oxide is blended.

Also, like the case of Comparative Example 5, a resin plate produced by blending a general vinyl chloride resin with large amounts, namely 80 parts by weight in total, of calcium carbonate and talc but without adding titanium oxide can show fire-retardant property which satisfies all criteria of the FM standard, but its strength and chemical resistance is extremely reduced so that it cannot be put into practical use.

In addition, in the case of the three layer structure resin plate of Example 13 in which a surface layer produced by blending a general vinyl chloride resin with a small amount of titanium oxide is laminated on both sides of a base layer having the same composition of Example 9 and the multiple layer structure resin plate of Example 14 in which low chlorination degree resin layers and high chlorination degree resin layers are alternately laminated in such a manner that the low chlorination degree resin layer is arranged on both sides of the resulting laminate, their fire-retardant property is slightly inferior to that of the resin plates of Examples 9 to 11 in which a post-chlorinated vinyl chloride resin having high chlorination degree is used alone but still can satisfy each criterion of the FM standard and, particularly, their bending can be made easily because of the improved elongation and their chemical resistance is markedly improved.

EXAMPLE 15

Calender sheets (0.5 mm in thickness) were produced by uniformly mixing 100 parts by weight of a post-chlorinated vinyl chloride resin having a chlorination degree of 65% with 15 parts by weight of alumina-coated titanium oxide (average particle size: about 0.2 $\mu$m or less), 5 parts by weight of zinc stannate as a fire retarding auxiliary, 8 parts by weight of a lead based stabilizer, 2 parts by weight of a lubricant and 5 parts by weight of a processing auxiliary, and then 10 of the sheets were piled up and pressed to obtain a single layer structure fire-retardant vinyl chloride resin plate (5 mm in thickness). Thereafter, FPI, SDI and CDI of this resin plate were measured and its mechanical strength and chemical resistance were examined. The results are shown in Table 4.

EXAMPLE 16

A single layer structure fire-retardant vinyl chloride resin plate (5 mm in thickness) was produced in the same manner as described in Example 15, except that 100 parts by weight of a resin mixture having an average chlorination degree of 62.5%, produced by blending 30 parts by weight of a general vinyl chloride resin having a chlorination degree of 56.8% with 70 parts by weight of a post-chlorinated vinyl chloride resin having a chlorination degree of 65%, was used instead of 100 parts by weight of the post-chlorinated vinyl chloride resin having a chlorination degree of 65%. Thereafter, FPI, SDI and CDI of this resin plate were measured. The results are shown in Table 4.

EXAMPLE 17

A single layer structure fire-retardant vinyl chloride resin plate (5 mm in thickness) was produced in the same manner as described in Example 15, except that 100 parts by weight of a resin mixture having an average chlorination degree of 59.3%, produced by blending 70 parts by weight of a general vinyl chloride resin having a chlorination degree of 56.8% with 30 parts by weight of a post-chlorinated vinyl chloride resin having a chlorination degree of 65%, was used instead of 100 parts by weight of the post-chlorinated vinyl chloride resin having a chlorination degree of 65%, and blending amount of the lead based stabilizer was changed from 8 parts by weight to 6 parts by weight. Thereafter, FPI, SDI and CDI of this resin plate were measured. The results are shown in Table 4.

EXAMPLE 18

A single layer structure fire-retardant vinyl chloride resin plate (5 mm in thickness) was produced in the same manner as described in Example 15, except that 100 parts by weight of a general vinyl chloride resin having a chlorination degree of 56.8% was used instead of 100 parts by weight of the post-chlorinated vinyl chloride resin having a chlorination degree of 65%, and blending amount of the lead based stabilizer was changed from 8 parts by weight to 4 parts by weight. Thereafter, FPI, SDI and CDI of this resin plate were measured. The results are shown in Table 4.

EXAMPLE 19

A single layer structure fire-retardant vinyl chloride resin plate (5 mm in thickness) was produced in the same manner as described in Example 18, except that 5 parts by weight of calcium zinc molybdate was used as a fire retarding auxiliary instead of 5 parts by weight of zinc stannate. Thereafter, FPI, SDI and CDI of this resin plate were measured. The results are shown in Table 4.

EXAMPLE 20

A single layer structure fire-retardant vinyl chloride resin plate (5 mm in thickness) was produced in the same manner as described in Example 18, except that 100 parts by weight of a vinyl chloride-ethylene copolymer resin having a chlorination degree of 54.0% was used instead of 100 parts by weight of the general vinyl chloride resin having a chlorination degree of 56.8%. Thereafter, FPI, SDI and CDI of this resin plate were measured. The results are shown in Table 4.

EXAMPLE 21

A single layer structure fire-retardant vinyl chloride resin plate (5 mm in thickness) was produced in the same manner as described in Example 15, except that 5 parts by weight of a phosphoric ester (phosphorus content: 9%) was used as a fire retarding auxiliary instead of 5 parts by weight of zinc stannate. Thereafter, FPI, SDI and CDI of this resin plate were measured. The results are shown in Table 4.

EXAMPLE 22

A single layer structure fire-retardant vinyl chloride resin plate (5 mm in thickness) was produced in the same manner as described in Example 18, except that 5 parts by weight of zinc stannate and 5 parts by weight of a phosphoric ester (phosphorus content: 9%) were used as fire retarding auxiliaries. Thereafter, FPI, SDI and CDI of this resin plate were measured and its mechanical strength and chemical resistance were examined. The results are shown in Table 4.

EXAMPLE 23

A calender sheet for base layer use (0.5 mm in thickness) was produced by uniformly mixing 100 parts by weight of a post-chlorinated vinyl chloride resin having a chlorination degree of 65% with 15 parts by weight of alumina-coated titanium oxide (average particle size: about 0.2 $\mu$m or less), 5 parts by weight of zinc stannate as a fire retarding auxiliary, 8 parts by weight of a lead based stabilizer, 2 parts by weight of a lubricant and 5 parts by weight of a processing auxiliary. Separately from this, a calender sheet for surface layer use (0.5 mm in thickness) was produced by uniformly mixing 100 parts by weight of a general vinyl chloride resin having a chlorination degree of 56.8% with 10 parts by weight of titanium oxide, 4 parts by weight of a lead based stabilizer, 2 parts by weight of a lubricant and 5 parts by weight of a processing auxiliary.

The calender sheet for base layer use and the calender sheet for surface layer use produced in this manner were laminated and pressed, thereby producing a three layer structure fire-retardant vinyl chloride resin plate (5 mm in total thickness) having a surface layer of 0.5 mm in thickness on both sides of a base layer of 4 mm in thickness. Thereafter, FPI, SDI and CDI of this resin plate were measured and its mechanical strength and chemical resistance were examined. The results are shown in Table 4.

EXAMPLE 24

A calender sheet for base layer use was produced in the same manner as described in Example 23, except that the amount of titanium oxide was changed from 15 parts by weight to 20 parts by weight and zinc stannate was omitted, and a calender sheet for surface layer use was produced in the same manner as described in Example 23, except that 5 parts by weight of zinc stannate was added and mixed. Using these calender sheets, a three layer structure fire-retardant vinyl chloride resin plate (5 mm in thickness) was produced in the same manner as described in Example 23. Thereafter, FPI, SDI and CDI of this resin plate were measured and its mechanical strength and chemical resistance were examined. The results are shown in Table 4.

EXAMPLE 25

A single layer structure vinyl chloride resin plate (5 mm in thickness) was produced in the same manner as described in Example 18, except that zinc stannate was omitted. Thereafter, FPI, SDI and CDI of this resin plate were measured. The results are shown in Table 4.

composition of the resin plate of Example 25, each of their FPI, SDI and CDI values was smaller than that of the resin plate of Example 25, showing that, when a fire retarding auxiliary is jointly used, fire-retardant property is further improved by its synergistic action with titanium oxide.

Also, comparison of the resin plate of Examples 15 to 18 reveals that each of the FPI, SDI and CDI values increases and the fire-retardant property decreases as the chlorination degree of vinyl chloride resin decreases.

Also, since the resin plate of Example 20 in which a vinyl chloride-ethylene copolymer was used showed small values of FPI, SDI and CDI, it can be understood that even a

TABLE 4

| | Example | | | | | | | | 23 | | 24 | | |
|---|---|---|---|---|---|---|---|---|---|---|---|---|---|
| | 15 | 16 | 17 | 18 | 19 | 20 | 21 | 22 | Base layer | Surface layer | Base layer | Surface layer | 25 |
| Composition (parts by weight) | | | | | | | | | | | | | |
| Post-chlorinated PVC (chlorination degree, 65%) | 100 | 70 | 30 | — | — | — | 100 | — | 100 | — | 100 | — | — |
| PVC (chlorination degree, 56.8%) | — | 30 | 70 | 100 | 100 | — | — | 100 | — | 100 | — | 100 | 100 |
| Ethylene-PVC (chlorination degree, 54.0%) | — | — | — | — | — | 100 | — | — | — | — | — | — | — |
| Lead based stabilizer | 8 | 8 | 6 | 4 | 4 | 4 | 8 | 4 | 8 | 4 | 8 | 4 | 4 |
| Lubricant | 2 | 2 | 2 | 2 | 2 | 2 | 2 | 2 | 2 | 2 | 2 | 2 | 2 |
| Processing auxiliary | 5 | 5 | 5 | 5 | 5 | 5 | 5 | 5 | 5 | 5 | 5 | 5 | 5 |
| Titanium oxide | 15 | 15 | 10 | 10 | 10 | 10 | 15 | 10 | 15 | 10 | 20 | 10 | 10 |
| Zinc stannate | 5 | 5 | 5 | 5 | — | 5 | — | 5 | 5 | — | — | 5 | — |
| Calcium zinc molybdate | — | — | — | — | 5 | — | — | — | — | — | — | — | — |
| Phosphoric ester | — | — | — | — | — | — | 5 | 5 | — | — | — | — | — |
| Fire-retardant property | | | | | | | | | | | | | |
| FPI | 0.4 | 0.8 | 1 | 1.2 | 2.1 | 1.5 | 1.6 | 1.1 | 1.9 | | 1.9 | | 3.0 |
| SDI | 0.02 | 0.03 | 0.06 | 0.1 | 0.03 | 0.15 | 0.1 | 0.08 | 0.06 | | 0.08 | | 0.2 |
| CDI | 0.4 | 0.5 | 0.7 | 0.8 | 1 | 0.9 | 0.5 | 0.6 | 0.5 | | 0.6 | | 1 |
| Strength | | | | | | | | | | | | | |
| Izod impact strength (kg · cm/cm$^2$) | 7.0 | — | — | — | — | — | — | 7.1 | 6.0 | | 6.0 | | 7.0 |
| Tensile strength (kg/mm$^2$) | 5.0 | — | — | — | — | — | — | 4.9 | 5.5 | | 5.7 | | 5.0 |
| Elongation (%) | 130 | — | — | — | — | — | — | 170 | 170 | | 150 | | 180 |
| Chemical resistance | | | | | | | | | | | | | |
| 97% Sulfuric acid | ○ | — | — | — | — | — | — | ◎ | ◎ | | ◎ | | ◎ |
| 35% Sulfuric acid | ◎ | — | — | — | — | — | — | ◎ | ◎ | | ◎ | | ◎ |
| 28% Aqueous ammonia | ◎ | — | — | — | — | — | — | ◎ | ◎ | | ◎ | | ◎ |

As is evident from the results shown in Table 4, each of the fire-retardant vinyl chloride resin plates of Examples 15 to 24 in which titanium oxide and a fire retarding auxiliary were jointly used is possessed of excellent fire-retardant property which satisfies each criterion of the FM standard satisfactorily, because FPI is within the range of from 0.4 to 2.1, SDI is within the range of from 0.02 to 0.1 and CDI is within the range of from 0.4 to 1. In addition, since the resin plate of Example 25 satisfied all criteria of FPI, SDI and CDI in spite of the absence of fire retarding auxiliary, the effectiveness of titanium oxide in providing fire-retardant property can be understood.

However, in the case of the resin plates of Examples 18, 19 and 22 in which zinc stannate, calcium zinc molybdate and a phosphoric ester, respectively, were added to the chlorine-containing copolymer can satisfy the FM standard when titanium oxide and a fire retarding auxiliary are jointly used.

Also, since fire-retardant property of the laminate structure resin plate of Example 23 was improved by the addition of a fire retarding auxiliary to the base layer, it can be understood that the surface layer has sufficient fire-retardant property even without containing fire retarding auxiliary.

In addition, the laminate structure resin plate of Example 24 does not contain fire retarding auxiliary in its base layer but contain titanium oxide in a larger amount than that of the resin plate of Example 18, and its surface layer has the same composition of the resin plate of Example 18, so that it can be understood that its fire-retardant property is not so different from that of the resin plate of Example 18.

While the invention has been described in detail and with reference to specific embodiments thereof, it will be apparent to one skilled in the art that various changes and modifications can be made therein without departing from the spirit and scope thereof.

This application is based on Japanese patent application No. Hei.-10-146507, filed on May 11, 1998, Hei.-10-267360, filed on Sep. 4, 1998, and Hei.-11-067945, filed on Mar. 15, 1999, incorporated herein by reference.

What is claimed is:

1. A fire-retardant vinyl chloride resin molding which comprises a base layer and a surface layer having a thinner thickness than that of the base layer provided on both sides of the base layer, wherein:

said base layer comprises from 4 to 30 parts by weight of titanium oxide and 100 parts by weight of a vinyl chloride resin;

said surface layer comprises from 0 to 20 parts by weight of titanium oxide and 100 parts by weight of a vinyl chloride resin; and the titanium oxide content of the surface layer is smaller than the titanium oxide content of the base layer.

2. A fire-retardant vinyl chloride resin molding which comprises a base layer and a surface layer having a thinner thickness than that of the base layer provided on both sides of the base layer, wherein:

said base layer comprises from 4 to 30 parts by weight of titanium oxide and 100 parts by weight of a chlorinated vinyl chloride resin;

said surface layer comprises from 0 to 20 parts by weight of titanium oxide and 100 parts by weight of a chlorinated vinyl chloride resin; and the titanium oxide content of the surface layer is smaller than the titanium oxide content of the base layer.

3. A fire-retardant vinyl chloride resin molding which comprises a base layer and a surface layer having a thinner thickness than that of the base layer provided both sides of the base layer, wherein:

said base layer comprises from 4 to 30 parts by weight of titanium oxide and 100 parts by weight of a chlorinated vinyl chloride resin;

said surface layer comprises from 0 to 20 parts by weight of titanium oxide and 100 parts by weight of a vinyl chloride resin having a chlorination degree of from about 50 to 58%; and the titanium oxide content of the surface layer is smaller than the titanium oxide content of the base layer.

4. The fire-retardant vinyl chloride resin molding according to claims 2 or 3, wherein the chlorination degree of the chlorinated vinyl chloride is from 58 to 73%.

5. The fire-retardant vinyl chloride resin molding according to claims 1, 2 or 3 wherein the titanium content of the surface layer is from 3 to 15 parts by weight.

6. A fire-retardant vinyl chloride resin molding which comprises a base layer and a surface layer having a thinner thickness than that of the base layer provided on both sides of the base layer, wherein:

said base layer comprises from 5 to 50 parts by weight of titanium oxide, 100 parts by weight of a vinyl chloride resin having a chlorination degree of from 58% to 73%, and at least one compounding agent selected from the group consisting of a chloride capturing compound, an inorganic auxiliary and a fire retarding auxiliary in such an amount that the total content of titanium oxide and the compounding agent in the base layer is 60 parts by weight or less based on 100 parts by weight of the vinyl chloride resin;

said surface layer comprises from 0 to 30 parts by weight of titanium oxide and 100 parts by weight of the vinyl chloride resin having a chlorination degree of 50 to 58%; and the titanium oxide content of the surface layer is smaller than the titanium oxide content of the base layer.

7. A fire-retardant vinyl chloride resin molding which comprises a base layer and a surface layer having a thinner thickness than that of the base layer provided on both sides of the base layer, wherein:

said base layer comprises from 5 to 50 parts by weight of titanium oxide and 100 parts by weight of a vinyl chloride resin having a chlorination degree of from 58% to 73%;

said surface layer comprises from 0 to 30 parts by weight of titanium oxide, 100 parts by weight of the vinyl chloride resin having a chlorination degree of 50% to 58%, and at least one compounding agent selected from the group consisting of a chloride capturing compound, an inorganic auxiliary and a fire retarding auxiliary in such an amount that the total content of titanium oxide and the compounding agent in the base layer is 40 parts by weight or less based on 100 parts by weight of the vinyl chloride resin; and the titanium oxide content of the surface layer is smaller than the titanium oxide content of the base layer.

8. A fire-retardant vinyl chloride resin molding which comprises a base layer and a surface layer having a thinner thickness than that of the base layer provided both sides of the base layer, wherein:

said base layer comprises from 5 to 50 parts by weight of titanium oxide, 100 parts by weight of a vinyl chloride resin having a chlorination degree of the 58% to 73%, and at least one compounding agent selected from the group consisting of a chloride capturing compound, an inorganic auxiliary and a fire retarding auxiliary in such an amount that the total content of titanium oxide and the compounding agent in the base layer is 60 parts by weight or less based on 100 parts by weight of the vinyl chloride resin;

said surface layer comprises from 0 to 30 parts by weight of titanium oxide, 100 parts by weight of the vinyl chloride resin having a chlorination degree of 50% to 58%, and at least one compounding agent selected from the group consisting of a chloride capturing compound, an inorganic auxiliary and a fire retarding auxiliary in such an amount that the total content of titanium oxide and the compounding agent in the base layer is 40 parts by weight or less based on 100 parts by weight of the vinyl chloride resin; and the titanium oxide content of the surface layer is smaller than the titanium oxide content of the base layer.

9. The fire-retardant vinyl chloride resin molding according to claims 6, 7 or 8, wherein the chloride capturing compound is selected from the group consisting of calcium carbonate, lithium carbonate, magnesium carbonate and a mixture thereof.

10. The fire-retardant vinyl chloride resin molding according to claims 6, 7 or 8, wherein the inorganic auxiliary is selected from the group consisting of silica, alumina, aluminum silicate and talc and a mixture thereof.

11. The fire-retardant vinyl chloride resin molding according to claims 6, 7 or 8, wherein the fire retarding auxiliary is at least one member selected from the group consisting of a zinc compound selected from zinc stannate, zinc borate, zinc stearate, zinc laurate, a mixture thereof, a molybdenum compound selected from molybdenum oxide, calcium molybdate, zinc molybdate, calcium zinc molybdate, ammonium octamolybdate, a mixture thereof, and a phosphorus compound selected from a phosphoric acid ester, a halogen-containing phosphoric acid aster, a polyphosphoric acid salt, red phosphorus, and a mixture thereof.

12. The fire-retardant vinyl chloride resin molding according to claims 1, 2, 3, 6, 7 or 8, wherein titanium oxide is coated with alumina.

* * * * *